United States Patent
Nakajima et al.

(10) Patent No.: US 10,014,998 B2
(45) Date of Patent: Jul. 3, 2018

(54) RECEIVING APPARATUS AND TRANSMITTING-RECEIVING APPARATUS

(71) Applicant: Mitsubishi Electric Corporation, Chiyoda-ku (JP)

(72) Inventors: Akinori Nakajima, Tokyo (JP); Takehiko Nishide, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/553,330

(22) PCT Filed: Feb. 1, 2016

(86) PCT No.: PCT/JP2016/052909
§ 371 (c)(1),
(2) Date: Aug. 24, 2017

(87) PCT Pub. No.: WO2016/143410
PCT Pub. Date: Sep. 15, 2016

(65) Prior Publication Data
US 2018/0115400 A1    Apr. 26, 2018

(30) Foreign Application Priority Data

Mar. 9, 2015  (JP) ................................ 2015-046485

(51) Int. Cl.
*H04L 5/00*      (2006.01)
*H04J 11/00*    (2006.01)
(Continued)

(52) U.S. Cl.
CPC ............ *H04L 5/0048* (2013.01); *H04J 11/00* (2013.01); *H04L 25/0224* (2013.01); *H04L 27/01* (2013.01)

(58) Field of Classification Search
None
See application file for complete search history.

(56) References Cited

U.S. PATENT DOCUMENTS 7,590,187 B2 *  9/2009  Jeong ..................... H04H 20/42
                                                                375/265
9,184,878 B2 * 11/2015  Jin ........................ H04L 1/0054
(Continued)

FOREIGN PATENT DOCUMENTS

JP      2012-516622 A    7/2012
JP      2012-520048 A    8/2012
(Continued)

OTHER PUBLICATIONS

3GPP TS 36.212 V9.2.0 "*3rd Generation Partnership Project; Technical Specification Group Radio Access Network; Evolved Universal Terrestrial Radio Access (E-UTRA); Multiplexing and channel coding (Release 9)*", Jun. 2010 (61 pages).

(Continued)

*Primary Examiner* — Mounir Moutaouakil
(74) *Attorney, Agent, or Firm* — Oblon, McClelland, Maier & Neustadt, L.L.P.

(57) ABSTRACT

A receiving apparatus includes: a control signal channel estimator to estimate a channel for a control signal using a pilot signal extracted from a received signal, and generate a first channel estimate value; a control signal FED unit to perform frequency domain equalization processing on the control signal by using the first channel estimate value; a control signal demodulator to demodulate the equalized control signal; a control signal encoder to encode a demodulated equalized control signal; an FFT unit to generate, from the encoded equalized control signal, a control signal replica; a data channel estimator to estimate a channel for the data signal by using the control signal replica and the first channel estimate value; and a data FDE unit to perform frequency domain equalization processing on the data signal by using the second channel estimate value.

8 Claims, 9 Drawing Sheets

(51) Int. Cl.
*H04L 27/01* (2006.01)
*H04L 25/02* (2006.01)

(56) References Cited

U.S. PATENT DOCUMENTS

| | | | |
|---|---|---|---|
| 9,432,059 B1* | 8/2016 | Sakamoto | H04B 1/123 |
| 2008/0101441 A1 | 5/2008 | Palanki | |
| 2009/0097466 A1 | 4/2009 | Lee et al. | |
| 2011/0004803 A1* | 1/2011 | Yokomakura | H03M 13/29 714/752 |
| 2011/0188561 A1* | 8/2011 | Mizrahi | H04B 1/1027 375/227 |
| 2011/0249779 A1* | 10/2011 | Miao | H04B 7/0848 375/347 |
| 2011/0274075 A1 | 11/2011 | Lee et al. | |
| 2011/0317722 A1* | 12/2011 | Gaddam | H04L 1/0057 370/474 |
| 2012/0002596 A1 | 1/2012 | Kim et al. | |
| 2012/0057519 A1 | 3/2012 | Kim et al. | |
| 2012/0082117 A1 | 4/2012 | Lee et al. | |
| 2012/0195399 A1* | 8/2012 | Zhu | H04L 1/0046 375/341 |
| 2013/0107975 A1 | 5/2013 | Castelain | |
| 2014/0286232 A1 | 9/2014 | Kim et al. | |
| 2015/0180638 A1 | 6/2015 | Lee et al. | |
| 2015/0207647 A1 | 7/2015 | Higashinaka | |
| 2015/0208431 A1* | 7/2015 | Chen | H04W 4/08 370/329 |
| 2015/0244430 A1* | 8/2015 | Shattil | H04B 1/0003 370/254 |
| 2016/0218890 A1* | 7/2016 | Sanderovich | H04L 25/03305 |
| 2017/0163448 A1* | 6/2017 | Huang | H04L 25/0204 |

FOREIGN PATENT DOCUMENTS

| | | |
|---|---|---|
| JP | 2013-038704 A | 2/2013 |
| JP | 2013-102505 A | 5/2013 |
| JP | 2013-529015 A | 7/2013 |
| JP | 2014-239505 A | 12/2014 |
| WO | 2010/101414 A2 | 9/2010 |
| WO | 2011/093671 A2 | 8/2011 |
| WO | 2011/138199 A1 | 11/2011 |
| WO | 2014/024369 A1 | 2/2014 |

OTHER PUBLICATIONS

Shinji Masuda, et al., "A Study on Timing Detection for Single Carrier Block Transmission using Sparse Pilot Symbols", 2011 Nen IEICE Communications Society Conference Koen Ronbunshu 1, Aug. 30, 2011, p. 385 (5 pages) (with English translation).

International Search Report and Written Opinion of the International Searching Authority dated Mar. 8, 2016 in PCT/JP2016/052909, filed Feb. 1, 2016.

* cited by examiner

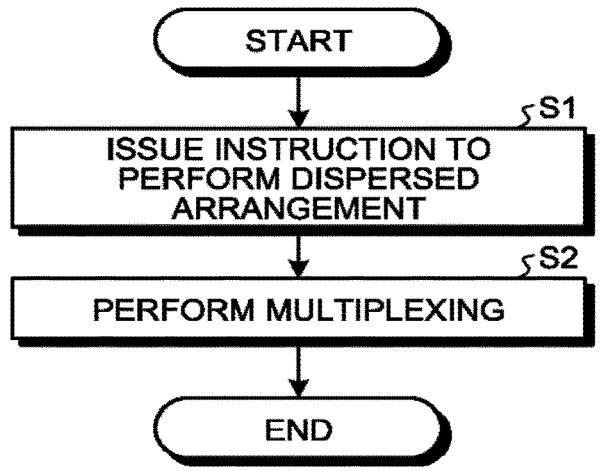
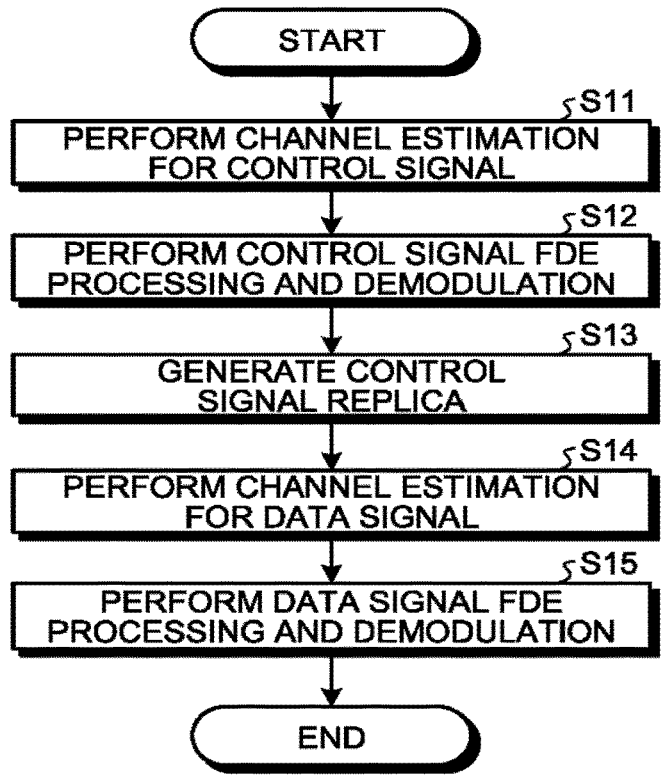

RECEIVING APPARATUS AND TRANSMITTING-RECEIVING APPARATUS

FIELD

The present invention relates to a receiving apparatus and a transmitting-receiving apparatus that estimate a channel in wireless communication.

BACKGROUND

Conventional base stations and terminals that perform wireless communication periodically transmit and receive control signals. The base station and the terminal convert information on reception conditions such as received signal field strength by using the control signals to determine the mutual channel state. The base station that has determined the channel state of the terminal specifies, for the terminal, an operation in a multi-antenna transmission and reception scheme, such as a modulation and coding scheme (MCS) or spatially multiplexed signal separation, and the radio resources to be allocated to the terminal, so as to implement adaptive radio transmission in accordance with the state of the channel between the base station and the terminal. When establishing adaptive radio transmission, the base station and the terminal need to receive control signals accurately. Control signal transmission requires high reception performance in order to resist noise interference and radio propagation path fluctuations due to fading.

To obtain high reception performance when transmitting control signals, a transmitting-side apparatus typically performs processing to increase the redundancy on the control signals by applying a low code rate in an error-correction code or by applying repetition processing or spread processing using a spreading sequence or the like. Further, the transmitting-side apparatus typically uses a modulation scheme having noise interference resistance in which the distance between signal points is large, with a modulation level such as binary phase-shift keying (BPSK) or quadrature phase-shift keying (QPSK). Hereinafter, transmission of control signals is referred to as control signal transmission, and radio transmission of data performed after exchange of control signals is referred to as data transmission.

A terminal moving at high speed tends to be degraded in the performance of detecting signals to be demodulated because deviation occurs between the channel value estimated using pilot signals that have a known pattern between the terminal and a base station and the channel value of the signals to be demodulated. Patent Literature 1 described below discloses a technique that is in response to this problem and that involves assigning control signals to symbol positions adjacent to pilot signals during control signal transmission in a Long Term Evolution (LTE) system standardized by 3GPP. By arranging control signals and pilot signals adjacently, an error in the estimation of a control signal channel is reduced, so that degradation in detection performance experienced by control signal transmission due to channel fluctuations can be reduced.

In the uplink in an LTE system, single-carrier block transmission (hereinafter, referred to as SCBT) is used, which has lower peak performance and places a smaller load on power amplifiers than the orthogonal frequency-division multiplex (OFDM) used in the downlink. It is called multi-access scheme single-carrier frequency-division multiple access (SC-FDMA) (Non Patent Literature 1 described below). In the LTE uplink, the physical uplink shared channel (PUSCH) is sometimes used to transmit control signals. When the PUSCH is used, a transmitting-side apparatus separately encodes data signals and control signals, then multiplexes them, and applies interleaving to a multiplexed sequence to generate an SC-FDMA symbol. A pilot signal is assigned to the third and thirteenth subframes, and an SC-FDMA symbol containing control signals is assigned the positions near the pilot signals to prevent degradation in the performance of receiving the control signals.

When SCBT is adapted for use in a high-speed mobile environment, a transmitting-side apparatus disposes an SC-FDMA control symbol, which is an SC-FDMA symbol containing control signals, near an SC-FDMA pilot symbol, which is an SC-FDMA symbol made up of pilot signals. However, even when a receiving-side apparatus can accurately detect the SC-FDMA control signal symbol, its reception performance for an SC-FDMA data symbol, which is an SC-FDMA symbol made up of data signals and is away from the SC-FDMA pilot symbol, may be degraded under the influence of a channel estimation error due to channel fluctuations. In particular, when a high modulation level is used in SC-FDMA data symbols, degradation in reception performance becomes conspicuous. By increasing the rate of insertion of SC-FDMA pilot symbols and disposing SC-FDMA data symbols near SC-FDMA pilot symbols, degradation in the performance of receiving the SC-FDMA data symbols due to channel fluctuations can be avoided. On the other hand, the increased rate of insertion of SC-FDMA pilot symbols leads to a reduction in transmission efficiency.

Patent Literature 2 described below discloses a technique that is in response to this problem and that involves achieving efficient insertion of pilot signals while maintaining low peak performance in SCBT. The dispersed arrangement of pilot signals implemented in OFDM can be implemented also in SCBT.

CITATION LIST

Patent Literature

Patent Literature 1: JP 2013-102505 A
Patent Literature 2: JP 2013-529015 A

Non Patent Literature

Non Patent Literature 1: 3GPP TS36.212 V9.2.0, 3rd Generation Partnership Project; Technical Specification Group Radio Access Network; Evolved Universal Terrestrial Radio Access (E-UTRA); Multiplexing and channel coding (Release 9), 2010 June

SUMMARY

Technical Problem

However, the above-described conventional techniques perform processing on control signals to obtain higher reception performance than that of data signals. Thus, there is a problem in that even when a receiving-side apparatus performs, on data signals that have not been subjected to processing to obtain high reception performance in contrast to control signals at a transmitting-side apparatus, the same channel estimation as that for control signals using pilot signals, the reception performance equal to that of control signals cannot be obtained.

The present invention has been made in view of the above and has an object of providing a receiving apparatus that can have an improved performance of receiving data signals and control signals.

Solution to Problem

To solve the above-described problem and achieve the object, a receiving apparatus according to an aspect of the present invention includes a first channel estimator to estimate a channel for a control signal using a pilot signal that is extracted from a received signal that is received from a transmitting apparatus and contains a data signal transmitted to the receiving apparatus, the control signal containing control information to be used in processing of receiving the data signal by the receiving apparatus, and the pilot signal having a pattern known between the receiving apparatus and the transmitting apparatus, and generate a first channel estimate value that is a result of estimation. Moreover, the receiving apparatus includes a first frequency domain equalizer to perform frequency domain equalization processing on the control signal by using the first channel estimate value, and output an equalized control signal. Furthermore, the receiving apparatus includes a control signal demodulator to demodulate the equalized control signal. Moreover, the receiving apparatus includes a control signal encoder to encode a demodulated equalized control signal. Furthermore, the receiving apparatus includes a replica generator to generate, from the encoded equalized control signal, a control signal replica that is a replica signal of the control signal. Moreover, the receiving apparatus includes a second channel estimator to estimate a channel for the data signal by using the control signal replica and the first channel estimate value, and generate a second channel estimate value that is a result of estimation. Furthermore, the receiving apparatus includes a second frequency domain equalizer to perform frequency domain equalization processing on the data signal by using the second channel estimate value.

Advantageous Effects of Invention

The present invention achieves an effect of being able to improve the performance of receiving data signals and control signals.

BRIEF DESCRIPTION OF DRAWINGS

FIG. 6 is a flowchart illustrating an example of processing of generating an SCBT symbol at the transmitting apparatus according to the first embodiment.

FIG. 7 is a flowchart illustrating an example of processing of receiving an SCBT symbol at the receiving apparatus according to the first embodiment.

DESCRIPTION OF EMBODIMENTS

Hereinafter, a receiving apparatus and a transmitting-receiving apparatus according to embodiments of the present invention will be described in detail with reference to the drawings. The embodiments are not intended to limit the invention.

First Embodiment

Figure 1:
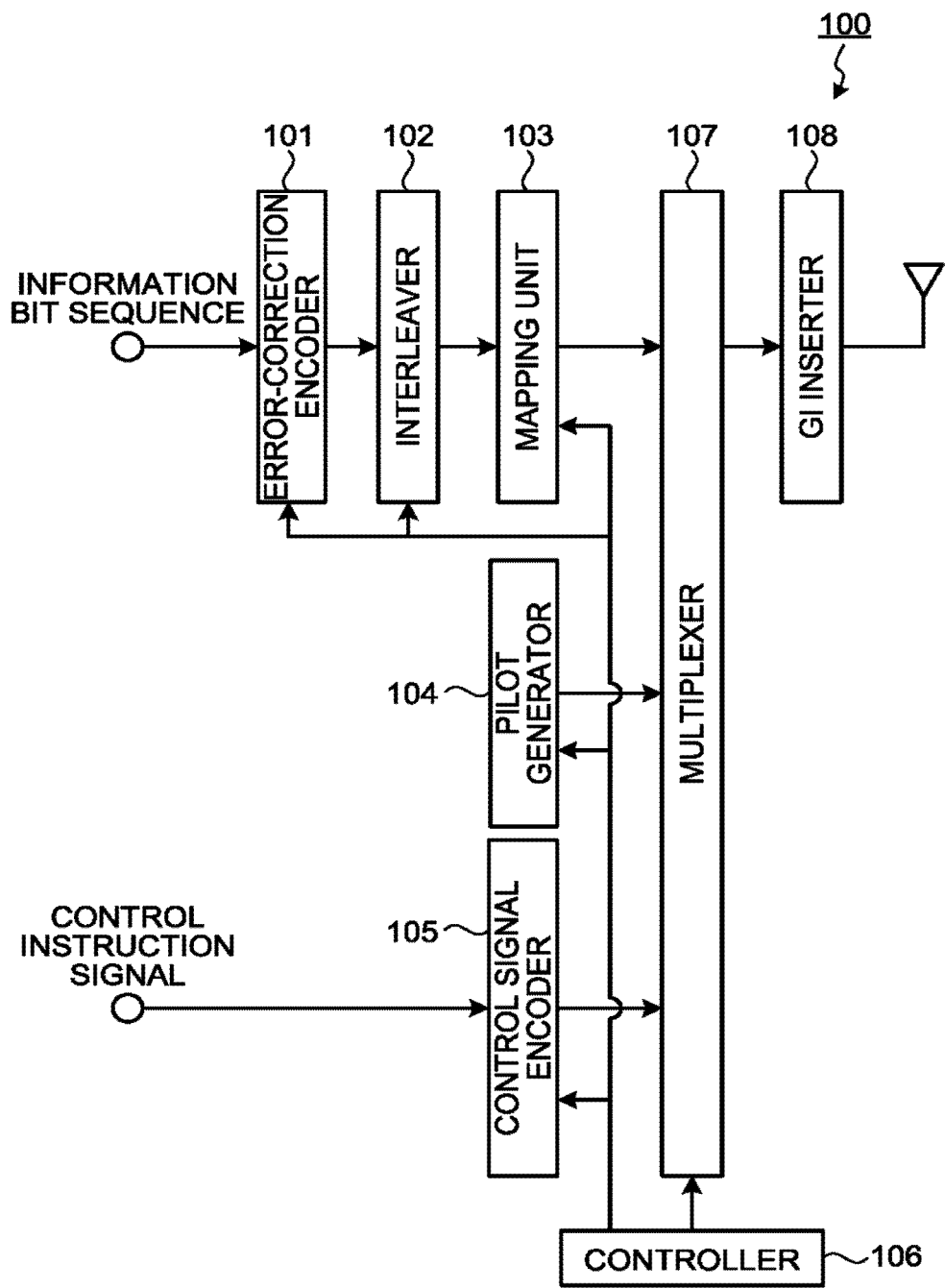
FIG. 1 is a block diagram illustrating an example configuration of a transmitting apparatus according to a first embodiment.

FIG. 1 is a block diagram illustrating an example configuration of a transmitting apparatus 100 according to a first embodiment of the present invention. In the transmitting apparatus 100 for SCBT, an error-correction encoder 101 performs error-correction processing on an information bit sequence on the basis of the code rate specified by a controller 106. Error correction includes a block code, a convolutional code, and the like, but is not limited to them. An interleaver 102 performs interleaving on the information bit sequence that has been subjected to the error-correction processing on the basis of the interleaver size or pattern specified by the controller 106, for changing the sequence of code words to convert a burst error to a random error. A mapping unit 103 is a data signal output unit that performs symbol mapping based on a multiple level specified by the controller 106 on the interleaved information bit sequence, and generates and outputs data signals to be transmitted to a receiving apparatus described below.

A pilot generator 104 is a pilot signal output unit that generates and outputs pilot signals having a pattern known between the transmitting apparatus and the receiving apparatus, according to an instruction of the controller 106.

A control signal encoder 105 is a control signal output unit that generates a control bit sequence, which is a signal of a bit sequence, from a control instruction signal; performs mapping after encoding processing; and generates and outputs control signals. Suppose the control signal contains control information to be used in data signal reception processing at the receiving apparatus. The detailed operation of the control signal encoder 105 will be described below.

A multiplexer 107 receives, in a block made up of single carrier symbols, which are SCBT symbols, the data signals generated by the mapping unit 103, the pilot signals generated by the pilot generator 104, and the control signals generated by the control signal encoder 105; multiplexes the data signals, the pilot signals, and the control signals or selects the data signals, the pilot signals, or the control signals in accordance with the control of the controller 106; and then outputs the signal.

The controller 106 controls data signal generation in the error-correction encoder 101, the interleaver 102, and the mapping unit 103, pilot signal generation in the pilot generator 104, control signal generation in the control signal encoder 105, and multiplexing processing in the multiplexer 107.

A guard interval (GI) inserter 108 inserts a guard interval (hereinafter, referred to as GI) into the multiplexed signal input from the multiplexer 107, and generates and outputs an SCBT symbol.

Figure 2:
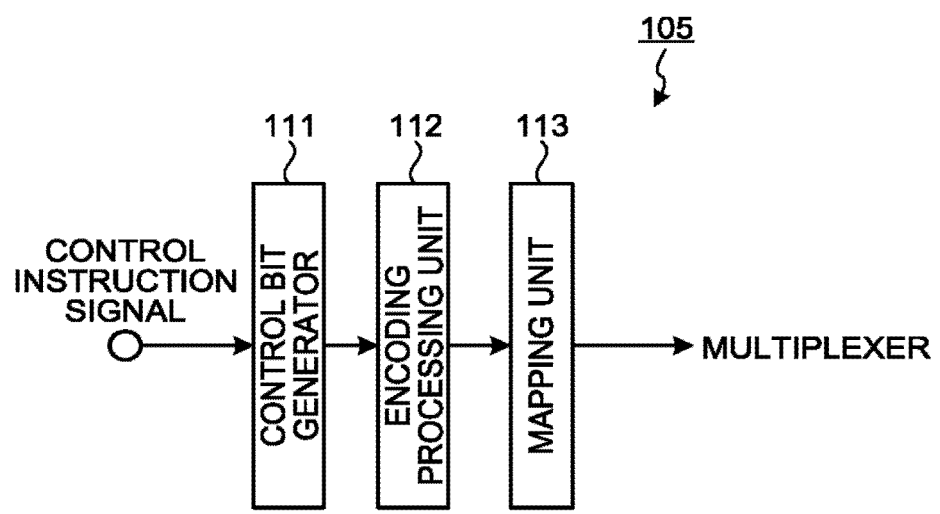
FIG. 2 is a block diagram illustrating an example configuration of a control signal encoder according to the first embodiment.

FIG. 2 is a block diagram illustrating an example configuration of the control signal encoder 105 according to the first embodiment. In the control signal encoder 105, a control bit generator 111 generates and outputs a control bit sequence corresponding to an input control instruction signal. An encoding processing unit 112 performs redundancy processing on the control bit sequence input from the control bit generator 111 in order to increase the noise interference resistance and improve the reception performance at the receiving apparatus. Specifically, the encoding processing unit 112 performs redundancy processing such as error-correction encoding, interleaving, repetition, or spread processing. A mapping unit 113 performs symbol mapping based on the multiple level specified by the controller 106 on the control bit sequence that has been subjected to the redundancy processing and is input from the encoding processing unit 112, and generates and outputs control signals. The control signal encoder 105 may perform redundancy processing such as repetition or spread processing after mapping.

In SCBT, the transmitting-side apparatus typically generates SCBT pilot symbols from pilot signals, and generates SCBT symbols in a frame format in which SCBT pilot symbols are inserted on the time axis between SCBT data symbols generated from data signals. For control signals, like pilot signals, the transmitting-side apparatus generates an SCBT control signal symbol by allocating control signals to all the resources constituting one SCBT symbol, and multiplexes it between SCBT data symbols. The transmitting-side apparatus can also multiplex data signals and control signals to form one SCBT symbol. In this case, data signals and control signals are in a superimposed form in the frequency domain, and the f-th frequency component D(f) is expressed by the following formula (1). In formula (1), d(t) corresponds to a data signal, c(t) corresponds to a control signal, and $N_d$ corresponds to the number of data signals relative to the number of signals $N_{FFT}$ formed in an SCBT symbol.

[Formula 1]

$$D(f) = \frac{1}{N_{FFT}} \left\{ \sum_{t=0}^{N_d-1} d(t)\exp\left(j2\pi f \frac{t}{N_{FFT}}\right) + \sum_{t=N_d}^{N_{FFT}-1} c(t)\exp\left(j2\pi f \frac{t}{N_{FFT}}\right) \right\} \quad (1)$$

The present embodiment has characteristics in the control of multiplexing processing in the multiplexer 107 by the controller 106, i.e., a method of multiplexing data signals, pilot signals, and control signals in the multiplexer 107. A method of multiplexing the signals at the transmitting apparatus 100 will be described below.

Next, the configuration of a receiving apparatus 200 that receives SCBT symbols transmitted from the transmitting apparatus 100 will be described.

Figure 3:
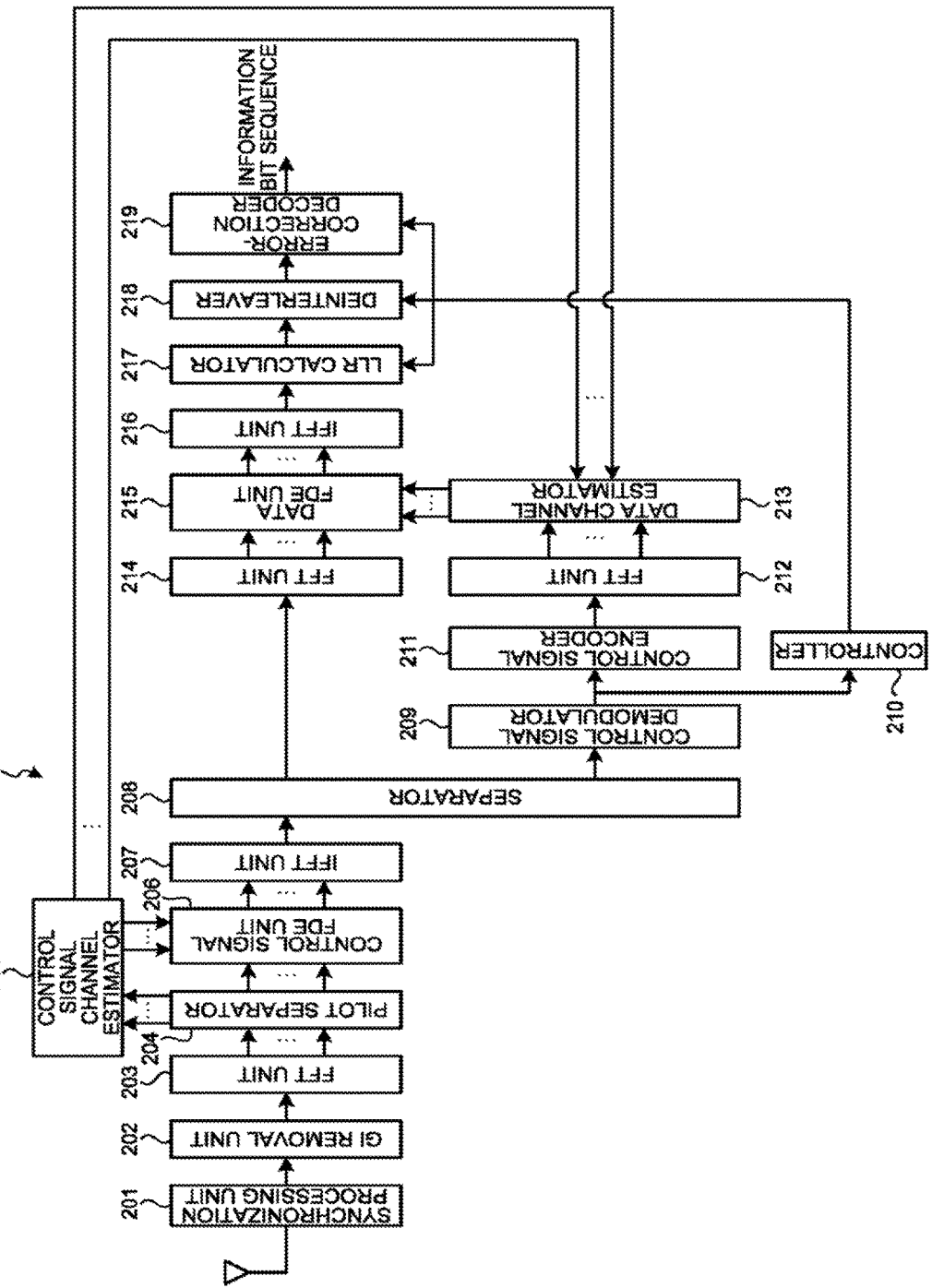
FIG. 3 is a block diagram illustrating an example configuration of a receiving apparatus according to the first embodiment.

FIG. 3 is a block diagram illustrating an example configuration of the receiving apparatus 200 according to the first embodiment. In the SCBT receiving apparatus 200, a synchronization processing unit 201 detects the timing to output, to a GI removal unit 202 at a subsequent stage, received signals of SCBT symbols containing data signals, pilot signals, and control signals received from the transmitting apparatus 100, and outputs the received signals at the detected timing. The GI removal unit 202 removes a GI inserted in the received signals, and outputs the GI-removed received signals. A fast fourier transform (FFT) unit 203 performs FFT processing on the GI-removed received signals to transform the received signals in the time domain into received signals in the frequency domain. A pilot separator 204 extracts received signals corresponding to SCBT pilot symbols from the received signals transformed into those in the frequency domain, and outputs them to a control signal channel estimator 205.

The control signal channel estimator 205 is a first channel estimator that performs, in order to demodulate the control signals, channel estimation for the control signals by performing linear interpolation or the like with the use of the pilot signals contained in the received signals corresponding to the SCBT pilot symbols extracted in the pilot separator 204. The control signal channel estimator 205 generates a first channel estimate value, which is the channel estimation result of execution of the channel estimation, and outputs it to a control signal frequency domain equalization (hereinafter, frequency domain equalization is referred to as FDE) unit 206. As typical channel estimation processing, by dividing a received signal of a pilot symbol by a pilot symbol value held on the receiving apparatus 200 side, a channel estimate value corresponding to the pilot symbol can be obtained. Next, a channel estimate value corresponding to the control signals can be obtained by performing linear interpolation or the like using the channel estimate value obtained from the pilot symbol.

The control signal FDE unit 206 is a first frequency domain equalizer that performs FDE processing on the control signals, using the first channel estimate value acquired from the control signal channel estimator 205. The FDE processing is processing to compensate for fading or the like experienced by an SCBT symbol transmitted from the transmitting apparatus 100 in a channel to the receiving apparatus 200. In SCBT, typically, FFT processing is performed on a received signal to transform it into a frequency-domain signal, and then the FDE processing is performed in the frequency domain. In the FDE processing, an equalization weight corresponding to each frequency is calculated, using a channel estimate value, and a linear operation to multiply a received signal of a frequency by the corresponding equalization weight is performed, so that interference components can be reduced. SCBT is a transmission scheme that enables equalization by such a simple operation. Of the control signals and the data signals contained in the received signals of the remaining SCBT symbols from which the received signals corresponding to the SCBT pilot symbols have been extracted in the pilot separator 204, the control signal FDE unit 206 performs the FDE processing only on the control signals, and outputs equalized control signals, which are FDE-processed control signals. The control signal FDE unit 206 outputs the data signals without performing the FDE processing.

An inverse fast fourier transform (IFFT) unit 207 performs IFFT processing on an SCBT symbol containing the equalized control signals and the data signals not subjected to the FDE processing to generate an SCBT symbol transformed from a frequency-domain signal into a time-domain signal. The data signals not subjected to the FDE processing may be stored in a memory without performing IFFT for a reduction in the amount of computation, and used in a data FDE unit 215 at a later stage.

A separator 208 separates the SCBT symbol, which is a time-domain signal input from the IFFT unit 207, into the equalized control signals and the data signals. The separator 208 outputs the equalized control signals separated from the SCBT symbol, which is a time-domain signal, to a control signal demodulator 209. The separator 208 outputs the data signals separated from the SCBT symbol, which is a time-domain signal, to an FFT unit 214.

The control signal demodulator 209 performs, on the equalized control signals separated by the separator 208, decoding processing, which is inverse processing corresponding to the encoding processing on a control bit sequence performed in the control signal encoder 105 of the transmitting apparatus 100, specifically, the encoding processing unit 112. Further, the control signal demodulator 209 demodulates the equalized control signals by hard decision, and generates and outputs the demodulated equalized control signals, i.e., a control bit sequence based on the equalized control signals. The detailed operation of the control signal demodulator 209 will be described below.

A controller 210 instructs each component to perform a demodulation operation and others in reception processing performed by the receiving apparatus 200, on the basis of the control bit sequence generated in the control signal demodulator 209. When MCS information is assigned to the control bit sequence, for example, the controller 210 obtains parameters of multilevel modulation, the code rate, and the code word length to be used from a table of correspondence between control bit sequences and the MCS that the controller 210 has, to specify them for a log-likelihood ratio (hereinafter, referred to as LLR) calculator 217, a deinterleaver 218, and an error-correction decoder 219. The controller 210, the LLR calculator 217, the deinterleaver 218, and the error-correction decoder 219 are configured the same as conventional ones, and thus the MCS will be described as an example below.

A control signal encoder 211 performs, on the equalized control signals demodulated in the control signal demodulator 209, the same encoding processing as the encoding processing performed on the control bit sequence by the control signal encoder 105 of the transmitting apparatus 100, specifically, the encoding processing unit 112, and outputs the encoded equalized control signals. Here, the output result of the control signal demodulator 209 is a hard decision value sequence. Alternatively, a soft decision value sequence may be output so that the control signal encoder 211 performs encoding processing using the soft decision value sequence on the basis of the soft decision value sequence.

An FFT unit 212 is a replica generator that performs FFT processing on the equalized control signals encoded in the control signal encoder 211 to generate control signal replicas, which are replica signals of the control signals.

A data channel estimator 213 is a second channel estimator that obtains a channel estimate value corresponding to the control signals using the control signal replicas generated in the FFT unit 212, and then performs, in order to demodulate the data signals, channel estimation for the data signals by performing linear interpolation or the like with the use of the channel estimate value corresponding to the control signals and the channel estimate value that corresponds to the pilot symbols and is the first channel estimate value input from the control signal channel estimator 205 to the data channel estimator 213. The data channel estimator 213 generates a second channel estimate value, which is the channel estimation result of execution of the channel estimation, and outputs it to the data FDE unit 215. The channel estimate value corresponding to the control signals using the control signal replicas can be obtained by dividing received signals of the control signals by the control signal replicas, as in the control signal channel estimator 205.

The FFT unit 214 performs FFT processing on the data signals separated in the separator 208 to transform them from a time-domain signal into a frequency-domain signal.

The data FDE unit 215 is a second frequency domain equalizer that performs FDE processing on the data signals, using the second channel estimate value acquired from the data channel estimator 213, and outputs equalized data signals, which are FDE-processed data signals. The FDE processing in the data FDE unit 215 is the same as the FDE processing in the control signal FDE unit 206.

An IFFT unit 216 performs IFFT processing on the equalized data signals to generate equalized data signals transformed from a frequency-domain signal into a time-domain signal.

The LLR calculator 217 calculates the LLR of the equalized data signals, on the basis of the multilevel modulation specified in the MCS by the controller 210. The deinterleaver 218 performs deinterleaving on the LLR calculated in the LLR calculator 217, on the basis of the code word length specified in the MCS by the controller 210. The error-correction decoder 219 performs error-correction decoding on the signals deinterleaved in the deinterleaver 218, on the basis of the code rate and the code word length specified by the controller 210, to generate and output an information bit sequence.

Figure 4:
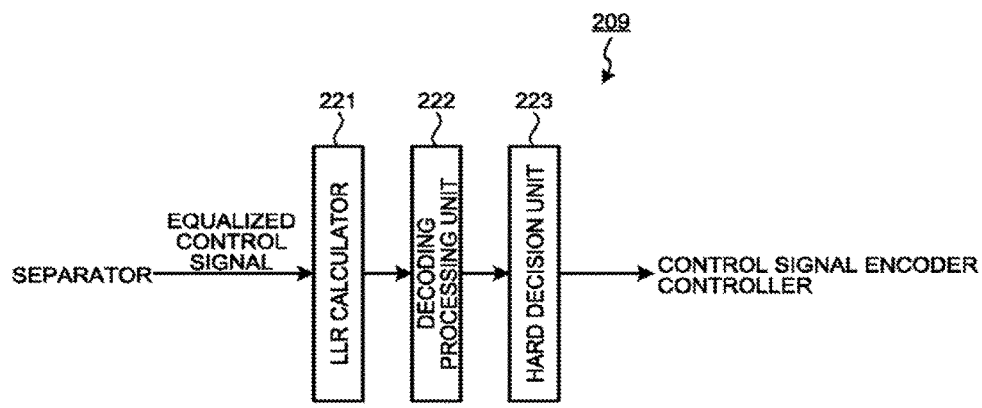
FIG. 4 is a block diagram illustrating an example configuration of a control signal demodulator according to the first embodiment.

FIG. 4 is a block diagram illustrating an example configuration of the control signal demodulator 209 according to the first embodiment. In the control signal demodulator 209, an LLR calculator 221 calculates the LLR of equalized control signals in accordance with the modulation scheme adopted. A decoding processing unit 222 performs, on the LLR calculated in the LLR calculator 221, decoding processing, which is inverse processing corresponding to the encoding processing performed in the encoding processing unit 112 of the transmitting apparatus 100. When the encoding processing performed by the encoding processing unit 112 of the transmitting apparatus 100 is repetition, the decoding processing unit 222 typically performs LLR combining decoding processing. When the encoding processing performed by the encoding processing unit 112 of the transmitting apparatus 100 is spread processing, the decoding processing unit 222 performs inverse spread decoding processing on the LLR sequence. A hard decision unit 223 performs hard decision on the signals decoded in the decoding processing unit 222 to demodulate the equalized control signals, and generates and outputs the demodulated equalized control signals, i.e., a control bit sequence based on the equalized control signals. The configuration of the control signal demodulator 209 illustrated in FIG. 4 is an example. When the encoding processing at the transmitting apparatus 100 is error-correction encoding, for example, the control signal demodulator 209 performs error-correction decoding to obtain a control bit sequence.

In the present embodiment, the receiving apparatus 200 first estimates a channel with respect to control signals that have been subjected to redundancy processing at the transmitting apparatus 100 to increase the reception performance compared to data signals, and performs decoding and re-encoding. Next, the receiving apparatus 200 performs channel estimation for the data signals using the control signal replicas generated after re-encoding and the channel estimate value of the control signals. When the receiving apparatus 200 performs channel estimation for data signals, it uses a channel estimate value of control signals, thereby increasing the number of samples used in linear interpolation or the like to improve the channel estimation accuracy and improve the data signal reception performance. The transmitting apparatus 100 enables control signals to be efficiently re-encoded easily and with a low delay, and orthogonalizes control signals and data signals or control signals and pilot signals in the frequency domain for transmission.

Here, a difference in operation between a conventional case where channel estimation is performed using pilot signals and FDE processing is performed on control signals and data signals at the same time, and a case as in the present embodiment where, first, channel estimation for control signals is performed and FDE processing on the control signals is performed, and then channel estimation for data signals is performed and FDE processing on the data signals is performed will be described.

When data signals and control signals are mixed in an SCBT symbol at a transmitting-side apparatus, the data signals and the control signals are typically superimposed at each frequency in the frequency domain. Consequently, when a receiving-side apparatus performs channel estimation using the control signals, it is necessary to not only generate replica signals of the control signals but also to generate replica signals including the data signals concomitantly. That is, the receiving-side apparatus needs to generate replica signals for a frequency component in which the data signals and the control signals are superimposed. A replica D(f)(hat) at the f-th frequency component is expressed by the following formula (2). d(t)(hat) represents a data signal replica, and c(t)(hat) represents a control signal replica.

[Formula 2]

$$\hat{D}(f) = \frac{1}{N_{FFT}} \left\{ \sum_{t=0}^{N_d-1} \hat{d}(t) \exp\left(j2\pi f \frac{t}{N_{FFT}}\right) + \sum_{t=N_d}^{N_{FFT}-1} \hat{c}(t) \exp\left(j2\pi f \frac{t}{N_{FFT}}\right) \right\} \quad (2)$$

When the receiving-side apparatus generates replica signals containing the control signals and the data signals, there is a disadvantage in that the amount of processing computation and the amount of delay increase in processing including error-correction decoding. On the other hand, when error-correction decoding is not included, the receiving-side apparatus does not use error correction, and thus data signal replicas tend to be lower in generation accuracy and have a larger error than control signal replicas. The expression of the replica signal D(f)(hat) containing the control signal and the data signal is expressed by the following formula (3) using the data signal replica d(t)(hat) and its error $e_d(t)$, and the control signal replica c(t)(hat) and its error $e_c(t)$. When error-correction decoding is not included, the tendency for $E[|e_c(t)|^2] < E[|e_d(t)|^2]$ is expected.

[Formula 3]

$$\hat{D}(f) = \qquad (3)$$

$$\frac{1}{N_{FFT}} \left\{ \sum_{t=0}^{N_d-1} \hat{d}(t) \exp\left(j2\pi f \frac{t}{N_{FFT}}\right) + \sum_{t=N_d}^{N_{FFT}-1} \hat{c}(t) \exp\left(j2\pi f \frac{t}{N_{FFT}}\right) \right\} =$$

$$\frac{1}{N_{FFT}} \left[ \sum_{t=0}^{N_d-1} \{d(t) + e_d(t)\} \exp\left(j2\pi f \frac{t}{N_{FFT}}\right) + \right.$$

$$\left. \sum_{t=N_d}^{N_{FFT}-1} \{c(t) + e_c(t)\} \exp\left(j2\pi f \frac{t}{N_{FFT}}\right) \right] =$$

$$D(f) + \frac{1}{N_{FFT}} \left[ \sum_{t=0}^{N_d-1} e_d(t) \exp\left(j2\pi f \frac{t}{N_{FFT}}\right) + \right.$$

$$\left. \sum_{t=N_d}^{N_{FFT}-1} e_c(t) \exp\left(j2\pi f \frac{t}{N_{FFT}}\right) \right]$$

When the data signal replica has a large error, the channel estimation accuracy may be degraded due to the effect of the error in the data signal replica even though the receiving-side apparatus performs channel estimation in the frequency domain using the replica signal D(f)(hat) containing the control signal and the data signal.

In order for the receiving-side apparatus to improve the channel estimation accuracy easily and with a low delay, the transmitting-side apparatus requires a transmission method that maintains orthogonalization between control signals and signals excluding the control signals, specifically, control signals and data signals or pilot signals in the time domain or the frequency domain. Here, for orthogonalization in the time domain at the transmitting-side apparatus, orthogonality can be achieved by forming control signals with one SCBT symbol and time-multiplexing the control signals with SCBT data symbols. However, it is necessary to insert a plurality of SCBT control symbols for adaptation to a high-speed mobile environment, and there is a disadvantage in that transmission efficiency is degraded.

Thus, in the present embodiment, the transmitting apparatus 100 orthogonalizes data signals and control signals in the frequency domain, i.e., orthogonalizes and multiplexes them in the frequency domain. The receiving apparatus 200 performs channel estimation for the control signals and the data signals, separately. Compared to the case where channel estimation is performed collectively for signals containing data signals and control signals, the receiving apparatus 200 can reduce the amount of computation in individual channel estimation in the channel estimation for control signals and the channel estimation for data signals. The receiving apparatus 200 can reduce the amount of computation and processing delay in the generation of replicas required in channel estimation using control signals. Further, when the receiving apparatus 200 is a mobile terminal, the transmitting apparatus 100 can arrange control signals in a dispersed manner so as to adapt to a high-speed mobile environment, and can reduce the degradation in transmission efficiency. The dispersed arrangement of control signals will be described below.

When a transmitting-side apparatus orthogonalizes data signals and control signals, it typically applies FFT processing to each of the data signals and the control signals, separately, arranges the obtained frequency components in a dispersed manner, and performs IFFT to be able to orthogonalize the data signals and the control signals in the frequency domain. However, there is a disadvantage in that a peak occurs in a time waveform because different spectra are superimposed.

Figure 5:
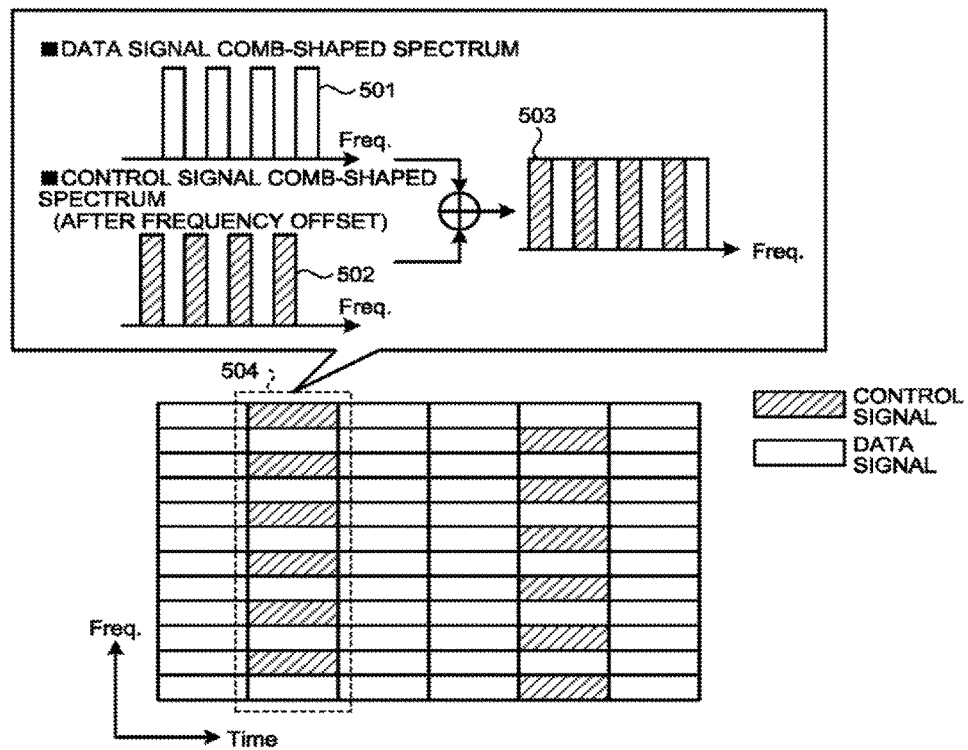
FIG. 5 is a diagram illustrating an example of a dispersed arrangement in which data signals and control signals are orthogonalized in the frequency domain in the first embodiment.

Thus, the transmitting apparatus 100 generates a frequency spectrum in which data signals and control signals are orthogonalized on the frequency axis. FIG. 5 is a diagram illustrating an example of a dispersed arrangement in which data signals and control signals are orthogonalized in the frequency domain in the first embodiment. The upper diagram in FIG. 5 illustrates data signals, control signals, and a combined frequency spectrum. The lower diagram in FIG. 5 is a diagram illustrating an example of an arrangement of SCBT symbols. In the lower diagram in FIG. 5, the horizontal axis represents time, the vertical axis frequency, and a portion indicated by a dotted-line range 504 constitutes one SCBT symbol.

The transmitting apparatus 100 generates a repeated waveform in which the data signal and the control signal alternately occur on the frequency axis with a cycle in which the number of repetitions is n in the frequency direction of each SCBT symbol. The number of repetitions n is two in the example in FIG. 5. The number of repetitions n is a value representing the frequency of occurrence of each signal in the frequency direction. The case where the number of repetitions n=2 in FIG. 5 is a state where a signal occurs once every two times, i.e., alternately in the region in the frequency direction. For example, the transmitting apparatus 100 forms, for the data signals, a frequency spectrum of a comb-shaped spectrum 501 of the data signals in a repeated waveform in which a signal occurs alternately in the region in the frequency direction of an SCBT symbol. The transmitting apparatus 100 forms, for the control signals, a frequency spectrum of a comb-shaped spectrum 502 of the control signals in a repeated waveform in which a signal occurs alternately in the region in the frequency direction of an SCBT symbol and a frequency offset is provided in order to prevent overlapping with the comb-shaped spectrum 501 of the data signals in the frequency domain. The transmitting apparatus 100 multiplexes the comb-shaped spectrum 501 of the data signals and the comb-shaped spectrum 502 of the control signals so as to be able to obtain a frequency spectrum 503 in which components of the data signals and the control signals are orthogonalized on the frequency axis. The case where the number of repetitions n=3 is a state where a signal occurs once every three times, i.e., every third time in the region in the frequency direction. In this case, pilot signals can be further combined in addition to data signals and control signals. For example, a comb-shaped spectrum of control signals that occur every third time in the region in the frequency direction is provided with a frequency offset so as not to overlap with a comb-shaped spectrum of data signals that occur every third time in the region in the frequency direction. Further, a comb-shaped spectrum of pilot signals that occur every third time in the region in the frequency direction is provided with a frequency offset so as not to overlap with the comb-shaped spectrum of the data signals and the comb-shaped spectrum of the control signals in the region in the frequency direction. Then, the transmitting apparatus 100 multiplexes the comb-shaped spectrum of the data signals, the comb-shaped spectrum of the control signals, and the comb-shaped spectrum of the pilot signals. The transmitting apparatus 100 may collectively perform the formation of the comb-shaped spectra of the signals on the frequency axis.

Patent Literature 2 described above discloses a multiplexing processing technique for performing orthogonalization using comb-shaped spectra that are a combination of only data signals and pilot signals. The transmitting apparatus 100 performs multiplexing processing with data signals and control signals in the same method as the multiplex combining processing with data signals and pilot signals disclosed in Patent Literature 2, thereby being able to obtain a waveform with a suppressed peak.

Operations of the transmitting apparatus 100 and the receiving apparatus 200 will be described with reference to flowcharts.

FIG. 6 is a flowchart illustrating an example of processing of generating an SCBT symbol at the transmitting apparatus 100 according to the first embodiment. The controller 106 instructs the multiplexer 107 to arrange in a dispersed manner data signals and control signals in an SCBT symbol into which the data signals and the control signals are multiplexed (step S1). The controller 106 specifies, for the multiplexer 107, the value of the number of repetitions n in a repeated waveform as described above. The controller 106 causes the multiplexer 107 to transform the control signals and the data signals into waveforms that occur periodically on the frequency axis and to multiplex the control signals and the data signals in a non-overlapping arrangement in the frequency domain.

Then, on the basis of an instruction from the controller 106, the multiplexer 107 transforms the data signals input from the mapping unit 103 into the waveform shown in the comb-shaped spectrum 501 of the data signals in FIG. 5, transforms the control signals input from the control signal encoder 105 into the waveform shown in the comb-shaped spectrum 502 of the control signals in FIG. 5, and multiplexes the comb-shaped spectrum 501 of the data signals and the comb-shaped spectrum 502 of the control signals (step S2). The multiplexer 107 performs multiplexing processing on an SCBT symbol determined from the position of an SCBT pilot symbol containing pilot signals on the basis of the SCBT frame format. The positional relationship between the SCBT symbol into which the control signals and the data signals are multiplexed and the SCBT pilot symbol containing the pilot signals will be described below.

In place of orthogonalizing and multiplexing control signals and data signals in the frequency domain, the transmitting apparatus 100 can orthogonalize and multiplex control signals and pilot signals in the frequency domain. The transmitting apparatus 100 can cope with this case with the same processing by replacing the data signals in FIG. 5 with pilot signals. In step S1 in the flowchart illustrated in FIG. 6 described above, the controller 106 instructs the multiplexer 107 to arrange pilot signals and control signals in a dispersed manner in an SCBT symbol into which the pilot signals and the control signals are multiplexed. The controller 106 causes the multiplexer 107 to transform the control signals and the pilot signals into waveforms that occur periodically on the frequency axis, and to multiplex the control signals and the pilot signals in a non-overlapping arrangement in the frequency domain.

At the transmitting apparatus 100, the controller 106 instructs the multiplexer 107 to perform the transformation and multiplexing of signals in the multiplexer 107, but is not limited to this. As described above, in a typical operation, the controller 106 controls the error-correction encoder 101, the interleaver 102, the mapping unit 103, the pilot generator 104, and the control signal encoder 105.

Thus, the controller 106 may specify the number of repetitions n for the mapping unit 103, and when outputting data signals to the multiplexer 107, instruct the mapping unit 103 to output them in the form of the comb-shaped spectrum 501 of the data signals in FIG. 5. The controller 106 instructs the mapping unit 103 to output data signals that occur periodically on the frequency axis without overlapping with control signals in the frequency domain. Likewise, the controller 106 may specify the number of repetitions n for the control signal encoder 105, and when outputting control signals to the multiplexer 107, instruct the control signal encoder 105 to output them in the form of the comb-shaped spectrum 502 of the control signals in FIG. 5. The controller 106 instructs the control signal encoder 105 to output control signals that occur periodically on the frequency axis without overlapping with data signals in the frequency domain. The controller 106 also instructs the multiplexer 107 to multiplex the control signals and the data signals in a non-overlapping arrangement in the frequency domain. Thus, the multiplexer 107 only needs to multiplex signals input from the mapping unit 103 and the control signal encoder 105, and the load of signal transformation in the multiplexer 107 can be reduced.

When control signals and pilot signals are multiplexed, the controller 106 specifies the number of repetitions n for the pilot generator 104 in place of the mapping unit 103, and when outputting pilot signals to the multiplexer 107, instructs the pilot generator 104 to output them in the form of the comb-shaped spectrum 501 of the data signals in FIG. 5. In this case, the controller 106 instructs the pilot generator 104 to output pilot signals that occur periodically on the frequency axis without overlapping with control signals in the frequency domain. Likewise, the controller 106 instructs the control signal encoder 105 to output control signals that occur periodically on the frequency axis without overlapping with the pilot signals in the frequency domain. The controller 106 also instructs the multiplexer 107 to multiplex the control signals and the pilot signals in a non-overlapping arrangement in the frequency domain.

When the controller 106 issues an instruction to the control signal encoder 105, there are no limitations on the control signals, which may be a symbol sequence of PSK, quadrature amplitude modulation (QAM), or the like, or may be a phase rotation sequence such as a Zadoff-Chu sequence. Further, the modulation scheme may be changed in a symbol sequence, or each symbol may be provided with a predetermined phase or a frequency deviation. For example, the modulation scheme may be in a form of mixing QPSK and π/4QPSK in one symbol sequence or a symbol sequence form in which a phase or frequency offset is provided to a symbol sequence.

FIG. 7 is a flowchart illustrating an example of processing of receiving an SCBT symbol at the receiving apparatus 200 according to the first embodiment. The control signal channel estimator 205 performs, in order to demodulate the control signals, channel estimation for control signals by performing linear interpolation or the like with the use of SCBT pilot symbols (step S11).

The control signal FDE unit 206 performs, on the control signals transformed into a frequency-domain signal by FFT processing, FDE processing by a linear operation for reducing interference components in the frequency domain, using a first channel estimate value acquired from the control signal channel estimator 205. Thereafter, through the IFFT unit 207 and the separator 208, the control signal demodulator 209 demodulates the equalized control signals (step S12).

The control signal encoder 211 performs encoding processing on a control bit sequence obtained by the demodulation. Then, the FFT unit 212 performs FFT processing to generate control signal replicas (step S13).

The data channel estimator 213 performs, in order to demodulate the data signals, channel estimation for data signals by performing linear interpolation or the like with the use of the control signal replicas and the first channel estimate value (step S14).

The data FDE unit 215 performs, on the data signals transformed into a frequency-domain signal by the FFT processing, FDE processing by a linear operation for reducing interference components in the frequency domain, using a second channel estimate value acquired from the data channel estimator 213. Then, the LLR calculator 217, the deinterleaver 218, and the error-correction decoder 219 demodulate the data signals (step S15).

As described above, the receiving apparatus 200 first performs channel estimation for control signals with high detection performance using only pilot signals, and performs the FDE processing and the demodulation processing on the control signals using the obtained channel estimation result. The receiving apparatus 200 can perform channel estimation for data signals using the pilot signals and the control signals, i.e., with an increased number of samples; therefore, it is possible to obtain a highly accurate channel estimation result. The receiving apparatus 200 can perform the FDE processing and the demodulation processing on the data signals using the highly accurate channel estimation result; therefore, the reception performance of the data signals can be improved.

Further, the receiving apparatus 200 can perform the FDE processing and the demodulation processing on control signals independently, irrespective of the FDE processing and the demodulation processing on data signals; therefore, the FDE processing and the demodulation processing on each of the signals can be implemented with low computation and low processing delay.

Furthermore, the transmitting apparatus 100 arranges control signals in a dispersed manner and generates an SCBT symbol for transmission; therefore, the receiving apparatus 200 can avoid an effect of a drop in received signal strength due to fading and also can obtain an effect of stably detecting control signals.

Description has been given of a method of multiplexing data signals and control signals at the transmitting apparatus 100. Next, the positional relationship between an SCBT symbol into which data signals and control signals are multiplexed and an SCBT symbol containing pilot signals will be described.

Figure 8:
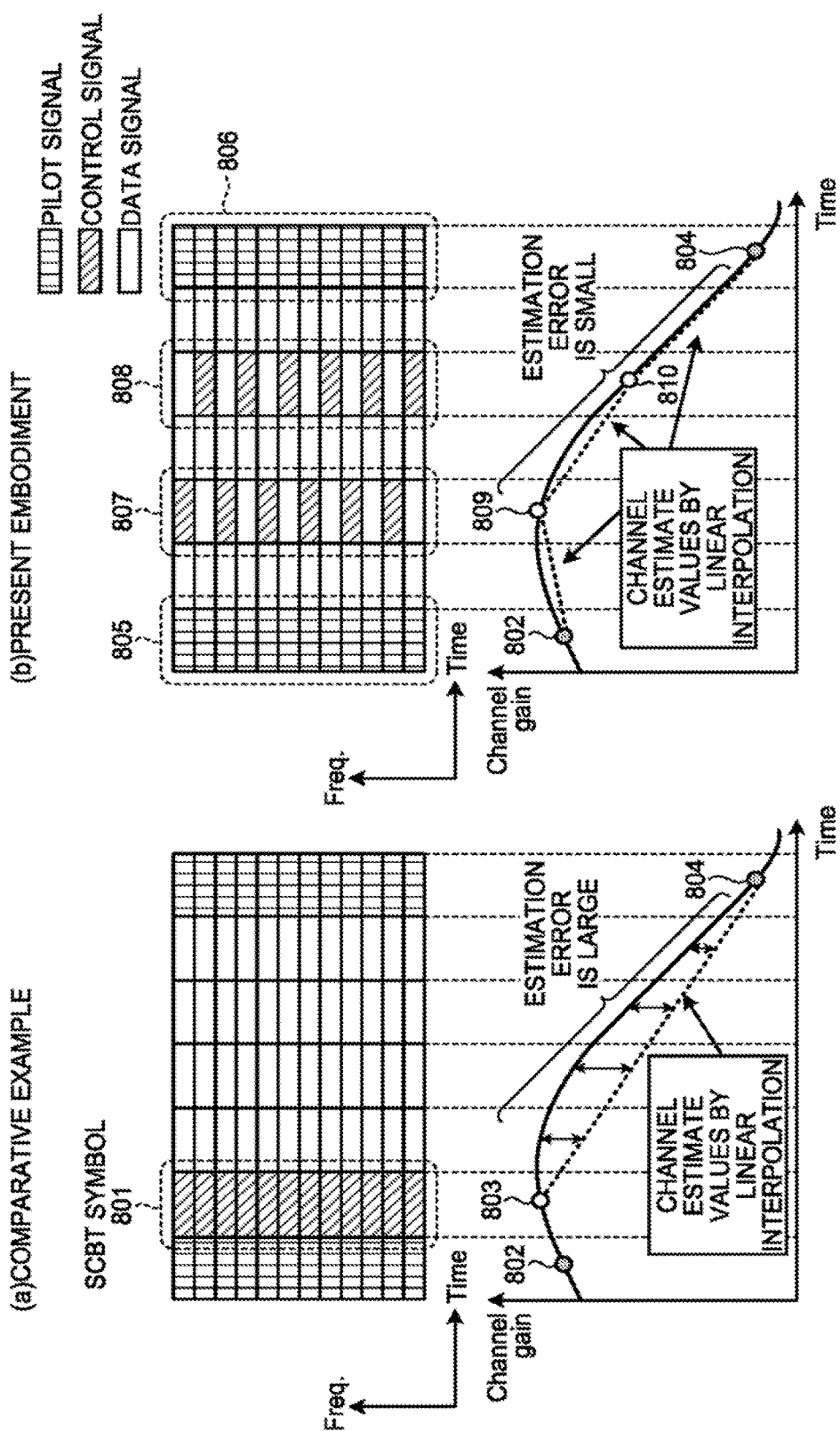
FIG. 8 is a diagram illustrating an example of an SCBT symbol arrangement at the transmitting apparatus according to the first embodiment and an SCBT symbol arrangement in a comparative example.

FIG. 8 is a diagram illustrating an example of an SCBT symbol arrangement at the transmitting apparatus 100 according to the first embodiment and an SCBT symbol arrangement in a comparative example. FIG. 8(a) illustrates an SCBT symbol arrangement in the comparative example, and FIG. 8(b) illustrates an SCBT symbol arrangement in the present embodiment. In FIGS. 8(a) and 8(b), the upper diagrams illustrate an example of an SCBT symbol arrangement, and the lower diagrams illustrate estimation error by channel estimation.

As illustrated in FIG. 8(a), when a transmitting-side apparatus disposes an SCBT symbol 801 made up of only control signals near an SCBT symbol made up of only pilot signals in the time axis direction, a receiving-side apparatus performs linear interpolation on data signals using a channel estimate value 803 obtained from the control signals and a channel estimate value 804 obtained from subsequent pilot signals. In this case, the receiving-side apparatus may be able to make the estimation error smaller than when linear interpolation is performed on data signals using channel estimate values 802 and 804 obtained from the pilot signals. However, the interpolation interval is shortened only by one time period, and thus the channel estimation error in the data signal region cannot be made smaller effectively. A dotted line illustrated in the lower diagram in FIG. 8(*a*) indicates channel estimate values by performing linear interpolation in the comparative example.

On the other hand, as illustrated in FIG. 8(*b*), when the transmitting apparatus 100 dispersedly arranges at regular intervals SCBT symbols 807 and 808 containing control signals periodically in the known interval between SCBT symbols 805 and 806 made up of only pilot signals, the receiving apparatus 200 can obtain channel estimate values at short time intervals. The receiving apparatus 200 performs linear interpolation on data signals using the channel estimate value 802 obtained from the pilot signals and a channel estimate value 809 obtained from the control signals. The receiving apparatus 200 also performs linear interpolation on the data signals using channel estimate values 809 and 810 obtained from the control signals. The receiving apparatus 200 also performs linear interpolation on the data signals using the channel estimate value 810 obtained from the control signals and the channel estimate value 804 obtained from the pilot signals. Thus, the receiving apparatus 200 can achieve highly accurate channel estimation for data signals and can make the estimation error of the channel estimate value by linear interpolation smaller than that in the comparative example. A dotted line illustrated in the lower diagram in FIG. 8(*b*) indicates channel estimate values by linear interpolation in the present embodiment.

The example in FIG. 8 illustrates the case where the number of SCBT symbols containing control signals is two, but is not limited to this. In this case, at the transmitting apparatus 100, the controller 106 instructs the multiplexer 107 to generate a plurality of, for example, three or more SCBT symbols containing control signals; to dispose one SCBT symbol containing the control signals near an SCBT symbol containing pilot signals; and to arrange the other SCBT symbols containing the control signals in a dispersed manner. Then, the multiplexer 107 arranges the SCBT symbols containing the control signals according to the instruction from the controller 106.

Figure 9:
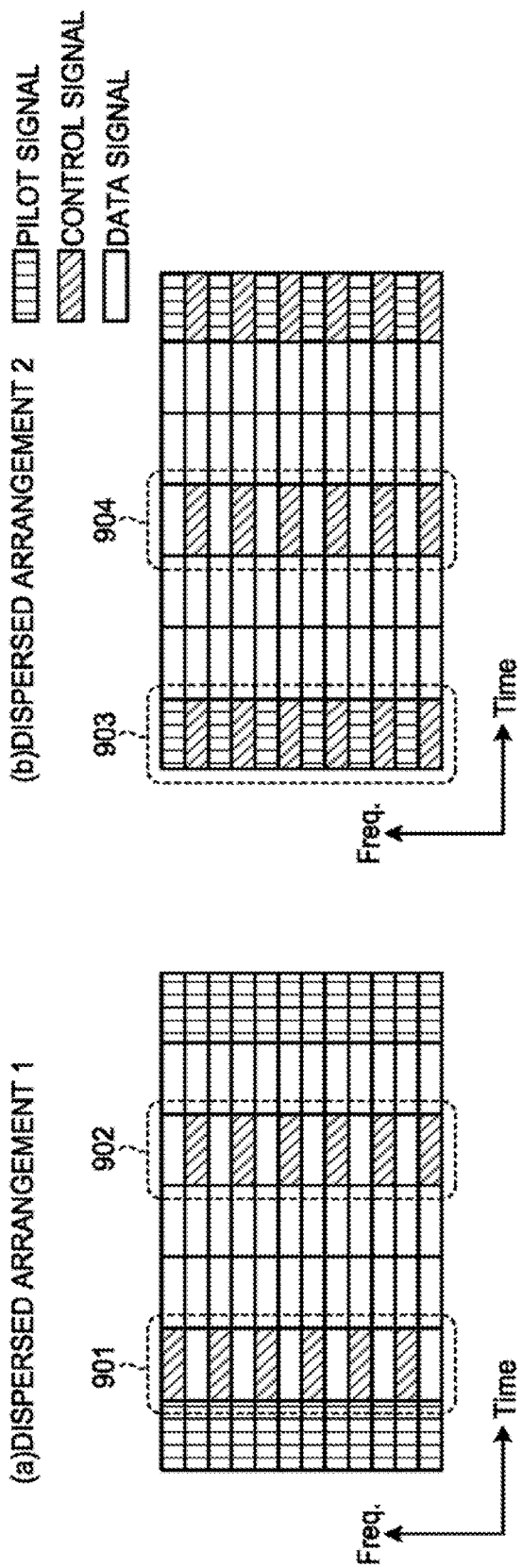
FIG. 9 is a diagram illustrating an example of an arrangement of SCBT symbols containing control signals at the transmitting apparatus according to the first embodiment.

Next, a case where pilot signals and control signals are multiplexed at the transmitting apparatus 100 will be described. FIG. 9 is a diagram illustrating an example of an arrangement of SCBT symbols containing control signals at the transmitting apparatus 100 according to the first embodiment. FIG. 9(*a*) illustrates dispersed arrangement 1 in which some of the control signals are disposed near pilot signals and the other control signals are arranged in a dispersed manner from the pilot signals. FIG. 9(*b*) illustrates dispersed arrangement 2 in which pilot signals and control signals are multiplexed and some of the control signals are arranged in a dispersed manner from the pilot signals.

At the transmitting apparatus 100, in dispersed arrangement 1, an SCBT symbol 901 containing some of the control signals is disposed near an SCBT symbol containing the pilot signals, and an SCBT symbol 902 containing the rest of the control signals is disposed away from the pilot signals. At the transmitting apparatus 100, in dispersed arrangement 2, like the control signals or the data signals described above, pilot signals also form a comb-shaped spectrum, and an SCBT symbol 903 into which the pilot signals and the control signals are multiplexed and an SCBT symbol 904 containing the rest of the control signals are disposed away from each other. In FIG. 9(*b*), a larger region can be provided for data signals than in FIG. 8 and FIG. 9(*a*), and thus the transmitting apparatus 100 can improve the transmission efficiency.

This allows the receiving apparatus 200 to use control signals arranged in a dispersed manner from pilot signals to improve the channel estimation performance for data signals while at the same time maintaining the reception performance quality of control signals disposed near the pilot signals. Even when a drop in received signal strength due to fading makes it difficult to detect pilot signals and control signals near the pilot signals, the dispersed arrangement of the control signals allows the receiving apparatus 200 to obtain a stable detection performance for the control signals because the subsequent control signals arranged in a dispersed manner are likely to be detected. Thus, the receiving apparatus 200 can improve the channel estimation accuracy for data signals while at the same time improving the reception performance for control signals. When the controller 106 causes the multiplexer 107 to generate a plurality of SCBT symbols containing control signals, the controller 106 may control the number and the arrangement of single carrier symbols containing the control signals, on the basis of the channel status between the receiving apparatus 200 and the transmitting apparatus 100. For example, when the channel status is good, the controller 106 arranges the control signals as in FIG. 9(*b*) to make the data signal region larger than that in the case in FIG. 9(*a*). This enables adaptive radio transmission at the transmitting apparatus 100 and the receiving apparatus 200 according to the channel status between the transmitting apparatus 100 and the receiving apparatus 200.

Figure 10:
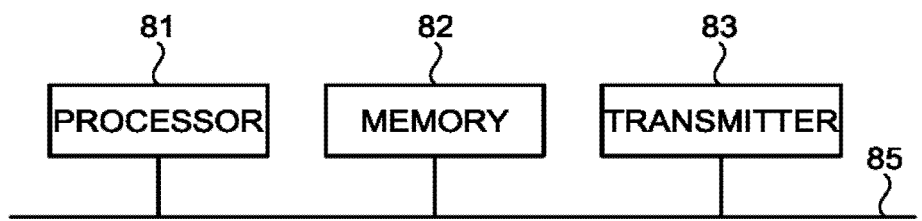
FIG. 10 is a diagram illustrating a hardware configuration implementing the configuration of the transmitting apparatus according to the first embodiment.

Here, a hardware configuration implementing the components in the block diagram of the transmitting apparatus 100 illustrated in FIG. 1 will be described. In the transmitting apparatus 100, the error-correction encoder 101 is an error-correction encoding circuit, the interleaver 102 is an interleaving circuit, the mapping unit 103 is a mapping circuit, the pilot generator 104 is a pilot generating circuit, the control signal encoder 105 is an encoding circuit, the multiplexer 107 is a multiplexing circuit, and the GI inserter 108 is a GI inserting circuit. In the transmitting apparatus 100 illustrated in FIG. 1, some of the components may be implemented by software. FIG. 10 is a diagram illustrating a hardware configuration implementing the configuration of the transmitting apparatus 100 according to the first embodiment. In the transmitting apparatus 100, some of the components are implemented by a processor 81 executing programs for the components stored in memory 82, thereby implementing the transmitting apparatus 100 together with a transmitter 83. The processor 81, the memory 82, and the transmitter 83 are connected via a system bus 85. A plurality of processors 81 and a plurality of memories 82 may cooperate with each other to execute the functions of the components illustrated in the block diagram in FIG. 1.

Figure 11:
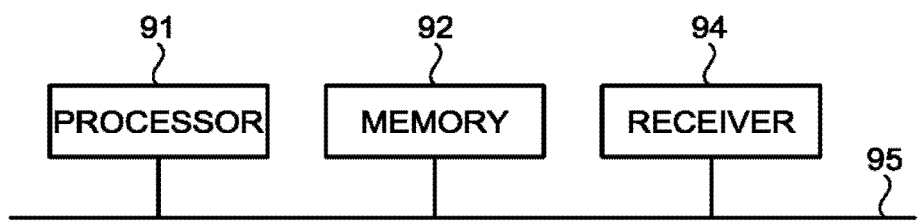
FIG. 11 is a diagram illustrating a hardware configuration implementing the configuration of the receiving apparatus according to the first embodiment.

Next, a hardware configuration implementing the components in the block diagram of the receiving apparatus 200 illustrated in FIG. 3 will be described. In the receiving apparatus 200, the synchronization processing unit 201 is a synchronization processing circuit, the GI removal unit 202 is a GI removing circuit, the FFT units 203, 212, and 214 are FFT circuits, the pilot separator 204 is a pilot separating circuit, the control signal channel estimator 205 and the data channel estimator 213 are channel estimating circuits, the control signal FDE unit 206 and the data FDE unit 215 are FDE circuits, the IFFT units 207 and 216 are IFFT circuits, the separator 208 is a separating circuit, the control signal demodulator 209 is a demodulating circuit, the controller 210 is a controlling circuit, the control signal encoder 211 is an encoding circuit, the LLR calculator 217 is an LLR calculating circuit, the deinterleaver 218 is a deinterleaving circuit, and the error-correction decoder 219 is an error-correction decoding circuit. In the receiving apparatus 200 illustrated in FIG. 3, some of the components may be implemented by software. FIG. 11 is a diagram illustrating a hardware configuration implementing the configuration of the receiving apparatus 200 according to the first embodiment. In the receiving apparatus 200, some of the components are implemented by a processor 91 executing programs for the components stored in memory 92, thereby implementing the receiving apparatus 200 together with a receiver 94. The processor 91, the memory 92, and the receiver 94 are connected via a system bus 95. A plurality of processors 91 and a plurality of memories 92 may cooperate with each other to execute the functions of the components illustrated in the block diagram in FIG. 3.

As described above, according to the present embodiment, the transmitting apparatus 100 orthogonalizes control signals and data signals or control signals and pilot signals in the frequency domain for transmission. The receiving apparatus 200 first performs channel estimation for control signals using pilot signals, and performs FDE processing and demodulation processing on the control signals using a channel estimate value of the control signals. Next, the receiving apparatus 200 performs channel estimation for data signals using control signal replicas generated from the demodulated control signals and the channel estimate value of the control signals, and performs FDE processing and demodulation processing on the data signals using a channel estimate value of the data signals. Thus, by performing channel estimation for data signals with an increased number of samples of the channel estimate value, the receiving apparatus 200 can improve the channel estimation accuracy for the data signals and improve data signal reception performance. Further, the receiving apparatus 200 can reduce the amount of computation and processing delay in the generation of replicas required in channel estimation using control signals.

The receiving apparatus 200 can enhance the performance of receiving control signals and data signals using control signals that are efficiently arranged in a dispersed manner for SCBT. In particular, the receiving apparatus 200 can improve the reception performance by making the channel estimation error for data transmission smaller and reducing the degradation in reception performance caused by a drop in received electric field strength due to fading in a high-speed mobile environment, and the receiving apparatus 200 can also achieve a stable performance of receiving control signals.

The transmitting apparatus 100 can stabilize the performance of receiving control signals at the receiving apparatus 200 by orthogonalizing control signals to data signals or pilot signals on the frequency or time axis for SCBT and by arranging them in a dispersed manner. In particular, the transmitting apparatus 100 can reduce the degradation of the control signal reception performance of the receiving apparatus 200 caused by a drop in received electric field strength due to fading in a high-speed mobile environment. Further, the orthogonalization of control signals and pilot signals or data signals on the frequency axis at the transmitting apparatus 100 allows the receiving apparatus 200 to perform FDE processing and demodulation processing on the control signals and the data signals separately. Therefore, the amount of computation and processing delay can be reduced.

Second Embodiment

In a second embodiment, description will be given of a method of improving, at the receiving apparatus 200, SCBT symbol synchronization performance, using control signals for synchronization processing on a received signal of an SCBT symbol received from the transmitting apparatus 100.

Figure 12:
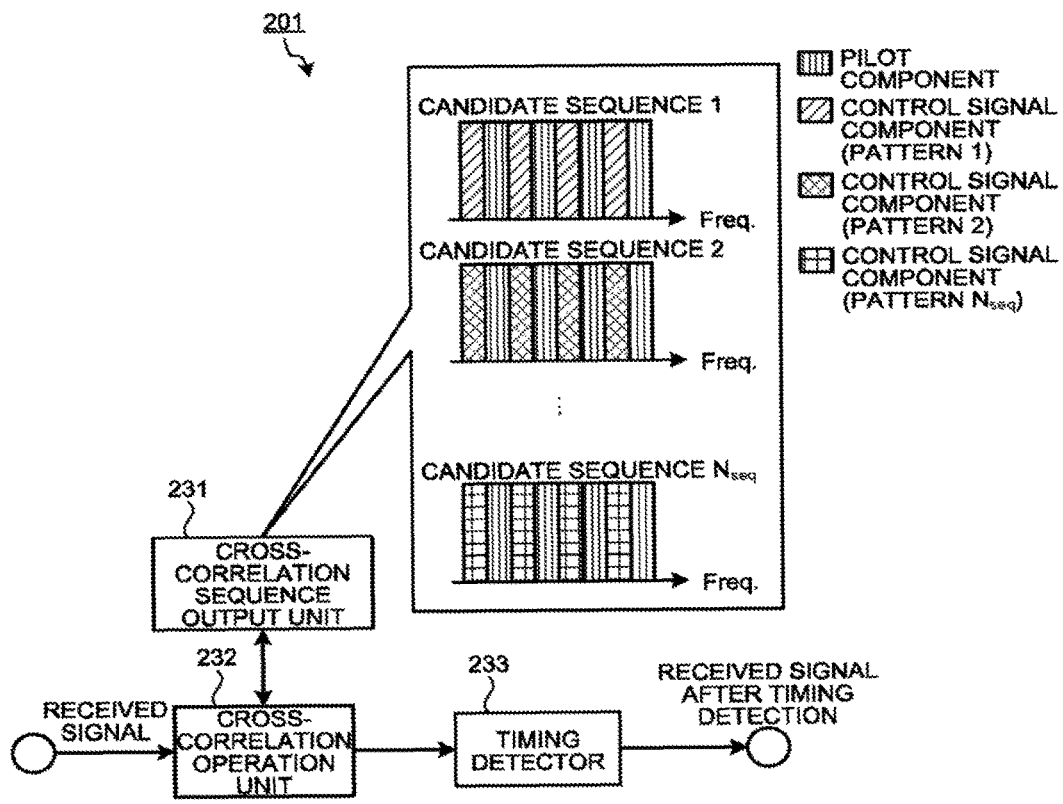
FIG. 12 is a block diagram illustrating an example configuration of a synchronization processing unit according to a second embodiment.

FIG. 12 is a block diagram illustrating an example configuration of the synchronization processing unit 201 according to the second embodiment. At the receiving apparatus 200, the synchronization processing unit 201 performs synchronization processing on an SCBT symbol. The synchronization processing unit 201 performs cross-correlation processing on a received signal using pilot signals or a preamble sequence, for example. The synchronization processing unit 201 detects frame timing $t_{offset}$ of an SCBT symbol on the basis of a correlation result $CC(t_{offset})$ obtained by the cross-correlation processing. An example of an arithmetic expression of a cross-correlation operation with the cross-correlation sequence length as L is shown in formula (4). r(t) represents a received signal and x(t) represents a sequence used in cross-correlation.

[Formula 4]

$$CC(t_{offset}) = \sum_{t=0}^{L-1} r(t + t_{offset})x^*(t) \quad (4)$$

x(t) is typically handled as a sequence in which a preamble or pilot signals are used in cross-correlation. However, in the present embodiment, some of the control signals arranged in a dispersed manner are used as x(t). Here, as an example, description is premised on dispersed arrangement 2 illustrated in FIG. 9(b), but the arrangement of control signals is not limited to this.

In the synchronization processing unit 201, a cross-correlation sequence output unit (cross-correlation sequence transmitter) 231 outputs cross-correlation sequences used in the operation of a cross-correlation with a received signal in a cross-correlation operator 232. Specifically, the cross-correlation sequence output unit 231 outputs candidate sequences 1, 2, . . . , $N_{seq}$ of cross-correlation sequences into which $N_{seq}$ control signal components corresponding to control signals that can be generated at the transmitting apparatus 100 and one pilot component corresponding to a pilot signal that can be generated at the transmitting apparatus 100 are multiplexed. The cross-correlation sequence output unit 231 stores the candidate sequences 1, 2, . . . , $N_{seq}$, which are a plurality of patterns of cross-correlation sequences, for example, and outputs cross-correlation sequences under the control of the cross-correlation operator 232. Alternatively, the cross-correlation sequence output unit 231 generates pilot signals of pilot components illustrated in FIG. 12, generates control signals of control signal components illustrated in FIG. 12, combines the generated pilot signals and the generated control signals, and generates and outputs the candidate sequences 1, 2, . . . , $N_{seq}$, which are cross-correlation sequences, under the control of the cross-correlation operator 232.

The cross-correlation operator 232 performs a cross-correlation operation on a received signal of an SCBT symbol received from the transmitting apparatus 100 and cross-correlation sequences output from the cross-correlation sequence output unit 231. Specifically, the cross-correlation operator 232 computes a cross-correlation value between a received signal of a received SCBT symbol and each cross-correlation sequence from the cross-correlation sequence output unit 231, using a cross-correlation function expressing the similarity between two signals as a numerical value.

A timing detector 233 stores the operation result, which is a cross-correlation value of each cross-correlation sequence subjected to a cross-correlation operation in the cross-correlation operator 232, and detects the timing to output the received signal on the basis of the operation results of the cross-correlation operations. Specifically, the timing detector 233 detects the timing with the highest correlation value, i.e., the timing to output the received signal, on the basis of the operation results of the cross-correlation operations, and outputs the received signal at the detected timing. The timing detector 233 can estimate a control signal pattern from the operation result of a cross-correlation operation, specifically, control signal components illustrated in FIG. 12, and thus may output information on a control signal pattern to the GI removal unit 202 at a subsequent stage.

As described above, according to the present embodiment, the transmitting apparatus 100 generates and transmits an SCBT symbol with the arrangement configuration in which pilot signals and some of the dispersed control signals are multiplexed. This allows the receiving apparatus 200 to improve the synchronization detection performance while reducing the degradation in transmission efficiency due to insertion of control signals. Further, the receiving apparatus 200 can detect a control signal pattern before performing FDE processing or the like.

In the present embodiment, description has been given of a method of detecting the timing by cross-correlation processing in the time domain in synchronization processing at the receiving apparatus 200; however, this is not a limitation. The receiving apparatus 200 may perform synchronization processing in which a cross-correlation operation is performed in the frequency domain.

The configuration of the synchronization processing unit (synchronization processor) 201 illustrated in FIG. 12 is not limited only to a single antenna case. That is, it is applicable to a multi-antenna case.

Third Embodiment

In the first and second embodiments, the transmitting apparatus 100 and the receiving apparatus 200 are independent separate apparatuses. The transmitting apparatus 100 and the receiving apparatus 200 can be included in a transmitting-receiving apparatus that can transmit and receive radio signals.

Figure 13:
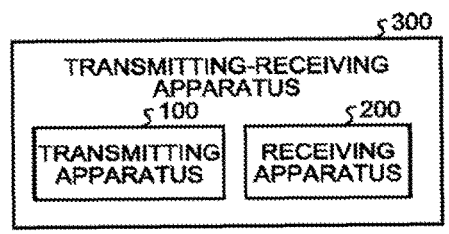
FIG. 13 is a block diagram illustrating an example configuration of a transmitting-receiving apparatus according to a third embodiment.

FIG. 13 is a block diagram illustrating an example configuration of a transmitting-receiving apparatus 300 according to a third embodiment. The transmitting-receiving apparatus 300 includes the transmitting apparatus 100 and the receiving apparatus 200. The transmitting apparatus 100 and the receiving apparatus 200 are the same as those in the first and second embodiments in configuration and operation.

The transmitting-receiving apparatus 300 includes the transmitting apparatus 100 and the receiving apparatus 200; therefore, when the transmitting-receiving apparatus 300 performs transmission and reception of signals to and from a terminal, the transmitting-receiving apparatus 300 can control the arrangement of control signals and the number of control signals arranged at the transmitting apparatus 100 on the basis of the reception conditions of data signals at the receiving apparatus 200.

The configurations illustrated in the above embodiments illustrate examples of the content of the present invention, and can be combined with another known art or can be partly omitted or changed without departing from the scope of the present invention.

REFERENCE SIGNS LIST 100 transmitting apparatus, 101 error-correction encoder, 102 interleaver, 103, 113 mapping unit, 104 pilot generator, 105, 211 control signal encoder, 106, 210 controller, 107 multiplexer, 108 GI inserter, 111 control bit generator, 112 encoding processing unit, 200 receiving apparatus, 201 synchronization processing unit, 202 GI removal unit, 203, 212, 214 FFT unit, 204 pilot separator, 205 control signal channel estimator, 206 control signal FDE unit, 207, 216 IFFT unit, 208 separator, 209 control signal demodulator, 213 data channel estimator, 215 data FDE unit, 217, 221 LLR calculator, 218 deinterleaver, 219 error-correction decoder, 222 decoding processing unit, 223 hard decision unit, 231 cross-correlation sequence output unit, 232 cross-correlation operator, 233 timing detector, 300 transmitting-receiving apparatus.

The invention claimed is:

1. A receiving apparatus comprising:
a first channel estimator to estimate a channel for a control signal using a pilot signal that is extracted from a received signal that is received from a transmitting apparatus and contains a data signal transmitted to the receiving apparatus, the control signal containing control information to be used in processing of receiving the data signal by the receiving apparatus, and the pilot signal having a pattern known between the receiving apparatus and the transmitting apparatus, and generate a first channel estimate value that is a result of estimation;
a first frequency domain equalizer to perform frequency domain equalization processing on the control signal by using the first channel estimate value, and output an equalized control signal;
a control signal demodulator to demodulate the equalized control signal;
a control signal encoder to encode a demodulated equalized control signal;
a replica generator to generate, from the encoded equalized control signal, a control signal replica that is a replica signal of the control signal;
a second channel estimator to estimate a channel for the data signal by using the control signal replica and the first channel estimate value, and generate a second channel estimate value that is a result of estimation; and
a second frequency domain equalizer to perform frequency domain equalization processing on the data signal by using the second channel estimate value.

2. The receiving apparatus according to claim 1, further comprising:
a synchronization processor to detect a timing to output the received signal, wherein
the synchronization processor includes
a cross-correlation sequence transmitter to output a cross-correlation sequence used in a cross-correlation operation with the received signal,
a cross-correlation operator to perform the cross-correlation operation between the received signal and the cross-correlation sequence, and
a timing detector to detect a timing to output the received signal on a basis of an operation result of the cross-correlation operation performed by the cross-correlation operator.

3. The receiving apparatus according to claim 2, wherein the cross-correlation sequence transmitter stores a plurality of patterns of cross-correlation sequences, and outputs the cross-correlation sequences under a control of the cross-correlation operator.

4. The receiving apparatus according to claim 2, wherein the cross-correlation sequence transmitter generates the pilot signal and the control signal, combines the generated pilot signal and the generated control signal, and generates and outputs the cross-correlation sequence under a control of the cross-correlation operator.

5. A transmitting-receiving apparatus comprising:
the receiving apparatus according to claim 1; and
a transmitting apparatus to orthogonalize and multiplex, in a frequency domain, a data signal transmitted to the receiving apparatus and a control signal containing control information to be used in processing of receiving the data signal by the receiving apparatus, or to orthogonalize and multiplex, in a frequency domain, the control signal and a pilot signal having a pattern known between the transmitting apparatus and the receiving apparatus, in a block made up of single carrier symbols.

6. The transmitting-receiving apparatus according to claim 5, wherein the transmitting apparatus transforms the control signal and the data signal into a waveform that occurs periodically on a frequency axis and multiplexes the control signal and the data signal in a non-overlapping arrangement in a frequency domain, or transforms the control signal and the pilot signal into a waveform that occurs periodically on a frequency axis and multiplexes the control signal and the pilot signal in a non-overlapping arrangement in a frequency domain.

7. The transmitting-receiving apparatus according to claim 5, wherein the transmitting apparatus generates a plurality of single carrier symbols containing the control signal, disposes one single carrier symbol containing the control signal near a single carrier symbol containing the pilot signal, and arranges, in a dispersed manner, another single carrier symbol containing the control signal.

8. The transmitting-receiving apparatus according to claim 7, wherein the transmitting apparatus controls arrangement of the another single carrier symbol containing the control signal on a basis of a channel status between the receiving apparatus and the transmitting apparatus.

* * * * *